Figure 1:
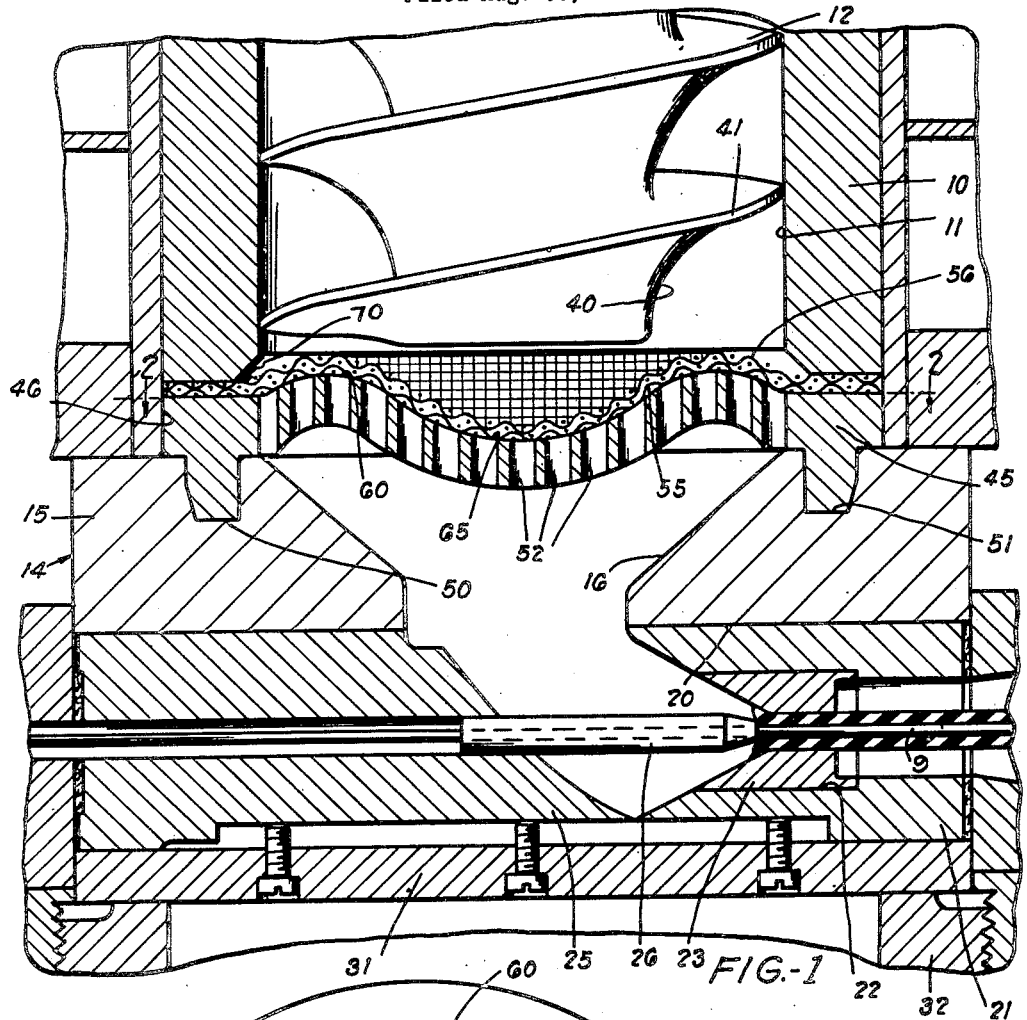

Jan. 23, 1951        A. N. GRAY        2,539,129

STRAINER FOR STRAINING PLASTIC MATERIAL

Filed Aug. 30, 1946

INVENTOR
A. N. GRAY
BY
ATTORNEY

Patented Jan. 23, 1951

2,539,129

UNITED STATES PATENT OFFICE 2,539,129

STRAINER FOR STRAINING PLASTIC MATERIAL

Alvin N. Gray, Joppa, Md., assignor to Western Electric Company, Incorporated, New York, N. Y., a corporation of New York Application August 30, 1946, Serial No. 693,925

4 Claims. (Cl. 146—174)

1

This invention relates to strainers for straining plastic material.

In the preparation of plastic material, such as a vulcanizable compound including a rubber or a synthetic rubber-like material, for molding or in extruding the material, the plastic material is sometimes forced through an extrusion or material-working apparatus by a stock screw having a cylindrical root and an annular screw portion. The material as it leaves the stock screw flows primarily in an annular stream, which annular stream diverges only slightly toward the axis of the stock screw as it enters the extrusion head.

Occasionally strainers are positioned at the end of the stock screw for straining the material as it is forced out of the apparatus. Such strainers may include a straining screen and a backing plate having passages therein. The screen if it is fine enough to strain oversized particles from the material, partially clogs up at the portions thereof which are aligned with the annular screw portion of the stock screw, through which portions of the screen most of the plastic material flows. Hence, the apparatus must be frequently stopped in order to clean these portions of the screen, while the portions of the screen positioned in alignment with the root of the stock screw are relatively clean.

An object of the invention is to provide new and improved strainers.

A further object of the invention is to provide new and improved strainers for straining plastic material being extruded into coverings upon the conductors.

A strainer illustrative of the invention includes a straining element designed to be positioned at the exit end of an extrusion bore in an extrusion cylinder, and is provided with a concave portion adjacent to the center of a root of a stock screw mounted rotatably in the extrusion bore. The stock screw serves to force the material from the extrusion bore in a cylindrical stream in which the greatest flow is in an annular portion thereof aligned with a screw portion of the stock screw. The straining element slants away from this annular portion of the stream of the plastic material being advanced through the extrusion bore by the stock screw so that oversized particles strained from the material by the straining element are deflected into a concave portion thereof, which is not aligned with the screw portion of the stock screw and therefore is a less active portion of the straining element. Hence, the more active portion of the straining element is

2 not clogged by oversized particles strained from the plastic material.

Figure 2:
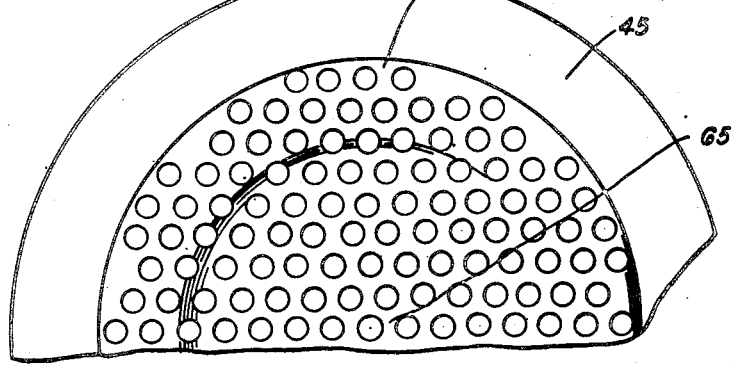

A complete understanding of the invention may be obtained from the following detailed description of a strainer forming a specific embodiment thereof, when read in conjunction with the appended drawing, in which:

Fig. 1 is a fragmentary, horizontal section of an extrusion apparatus including a strainer forming one embodiment of the invention, and Fig. 2 is a fragmentary, vertical section taken along line 2—2 of Fig. 1.

Referring now in detail to the drawing, there is shown in Fig. 1 a continuous extrusion apparatus for forming a covering from plastic material, such as a vulcanizable rubber compound or a vulcanizable compound including a synthetic rubber-like material, around a filamentary conductor 9, which may be bare or may be covered with a textile or plastic covering. The extrusion apparatus includes an extrusion cylinder 10 having a cylindrical extrusion bore 11 formed therein in which a stock screw 12 is mounted. The stock screw is rotated by suitable driving means, such as an electric motor and a gear train (not shown), to force the plastic material under high pressure through an extruding head 14. The extruding head includes a body member 15 having a tapered opening 16, which forms a continuation of the extrusion bore 11 and communicates with a bore 20 formed in the extruding head transversely of the tapered opening 16. An annular die holder 21 positioned in the exit end of the bore 20 has a counterbore 22 formed therein in which is mounted a forming die 23.

The conductor 9 is advanced toward the right, as viewed in Fig. 1, by suitable conductor-advancing means, such as a capstan (not shown), through a core tube holder 25 and a core tube 26, which is held by the core tube holder 25. The core tube holder is provided with an inclined concave surface 27 for deflecting the plastic material toward the die 23. An aligning plate 31 maintains the die holder 21 and the core tube holder 25, and thereby the die 23 and the core tube 26, centered relative to each other in the bore 20 in the extruding head 14, and a retaining nut 32 holds these elements in the extruding head.

The stock screw 12 includes a cylindrical root 40 and a thread portion 41 extending outwardly from the root 40. The plastic material is forced by the stock screw toward the exit of the extrusion bore 11 in the extrusion cylinder 10 primarily in an annular stream, the width of which is determined to a large extent by the distance between the extrusion bore 11 and the cylindrical root 40 centered therein.

A backing plate 45 mounted in a counterbore 46 formed in the extrusion cylinder 10 is provided with an annular projection 50 designed to project into an annular socket 51 formed in the body portion 15 of the extrusion head 14. The backing plate 45 has a plurality of plasticizing passages 52—52 formed therein through which the plastic material is forced from the extrusion bore 11 and serves as a backing plate for a coarse backing screen 55, which supports a fine straining screen 56.

The backing plate is provided with an annular convex portion 60, which portion is aligned with the thread portion 41 of the stock screw 12 and through which portion is forced the main stream of the plastic material forced from the extrusion bore 11 by the stock screw 12. That is, the portion of the fine straining screen 56 at the annular convex portion 60 of the backing plate is the most active portion of the straining screen 56. The backing plate slants away from the crown of the annular convex portion toward the outer portion thereof, which portion is adjacent to the wall of the extrusion bore 11, which wall slows the flow of the material adjacent thereto somewhat so that the outer portion of the screen 56 adjacent thereto is not as active as the portion of the straining screen 56 positioned inwardly of and adjacent thereto.

The backing plate 45 slants from the convex portion 60 away from the end of the screw portion 41 of the stock screw 12 toward the center of the backing plate 45 and forms a concave portion 65. The annular stream of plastic material urged along the extrusion bore 11 by the stock screw 12 diverges inwardly to some extent as it leaves the end of the stock screw. However, less flow per unit cross-sectional area of the extrusion bore occurs at the concave portion 65 of the backing plate than at the convex portion 60 thereof. That is, that the portion of the straining screen 56 adjacent to the concave portion 65 is a less active portion than the portion thereof adjacent to the convex portion 60 of the backing plate.

The pressure of the plastic material upon the fine screen 56 forces it against the backing screen 55 and forces the backing screen 55 tightly against the backing plate 45 so that the screens 56 and 55 have the same contours as that of the backing plate 45. Hence, oversized particles strained from the plastic material at the convex portion of the screen 56, which portions of the screen 56 are the most active thereof, are deflected by the undulating contour of the screen 56 toward the less active portions thereof by the material so that the more active portions of the screen 56 are kept free of the strained particles. Thus, the screen 56 need be removed from the extrusion apparatus and cleaned much less often than a flat screen.

The extrusion cylinder 10 is provided with a relieved portion 70 to form an annular sump at the outer edge of the effective portion of the straining screen 56. This sump provides sufficient space to accumulate the oversized particles deflected outwardly without clogging the more active areas of the straining screen.

In the operation of the apparatus described hereinabove, plastic material is forced through the extrusion bore 11 in the extrusion cylinder 10 by the stock screw 12. The primary flow of the plastic material is directly ahead of the annular screw portion 41, and the material flows through the portion of the straining screen 56 adjacent to the convex portion 60 of the backing plate 45. The material spreads somewhat toward the center and the outer periphery of the screen 56 and carries oversized particles strained by the convex portion of the screen 56 either to the outer portion of the screen 56 or to the concave center portion thereof, which portions are the less active portions of the screen 56. Hence, the most active portion of the screen 56 is kept free of oversized particles so that the apparatus need not be stopped often for cleaning the screen 56.

What is claimed is:

1. A strainer, which comprises a conduit, means for forcing plastic material through the conduit, said material-forcing means serving to force the material in a predetermined direction and through predetermined portions of the conduit at a higher rate of flow per unit cross-sectional area than that through other predetermined portions of the conduit, and a straining element having convex portions at the portions of the conduit through which the plastic material is forced at the higher rate of flow, said convex portions facing directly opposite to the direction of flow of the material, whereby debris strained thereby is flushed therefrom.

2. A strainer, which comprises a conduit, a stock screw mounted in the conduit for forcing plastic material therethrough, and a straining element positioned at the exit of the extrusion bore near the end of the stock screw, the central portion of the straining element being concave and the outer portion of the straining element being convex in directions facing the stock screw, whereby debris is flushed from the convex outer portion of the element.

3. A strainer, which comprises a conduit, a stock screw mounted in the conduit for forcing plastic material therethrough, a backing plate positioned near the exit end of the conduit and near the end of the stock screw and having a surface facing the stock screw, said surface being concave in the central portion thereof aligned with the root of the screw and convex in the outer portion thereof aligned with the thread of the screw, and straining means including a straining screen positioned on said surface of the backing plate, whereby the convex portion of the backing plate is kept flushed.

4. A strainer, which comprises a conduit, a stock screw having a central root portion and a helical outer portion for forcing plastic material through the conduit, one end of said extrusion screw extending substantially to the exit of the conduit, a backing plate positioned at the exit of the conduit and having a cup-shaped concave portion facing the root of the stock screw and an annular convex portion facing the helical outer portion of the screw, said backing plate having a plurality of passages therein, a fine screen positioned between the stock screw and the backing plate, said fine screen having the same contour as the backing plate, and a coarse backing screen positioned between the fine screen and the backing plate for supporting the fine screen and having the same contour as the backing plate.

ALVIN N. GRAY.

(References on following page)

REFERENCES CITED

The following references are of record in the file of this patent:

UNITED STATES PATENTS

| Number | Name | Date |
|---|---|---|
| 440,971 | Stoerger | Nov. 18, 1890 |
| 656,804 | Bonnot | Aug. 28, 1900 |
| 890,527 | Nutter | June 9, 1908 |
| 1,007,016 | Weir | Oct. 24, 1911 |
| 1,732,618 | Royle | Oct. 22, 1929 |
| 1,931,872 | Lodge | Oct. 24, 1933 |
| 2,013,009 | Satzinger | Sept. 3, 1935 |

FOREIGN PATENTS

| Number | Country | Date |
|---|---|---|
| 159,403 | Great Britain | Mar. 3, 1921 |
| 457,347 | Great Britain | Nov. 26, 1936 |